Dec. 9, 1941.           J. H. FINE           2,265,899
WHEEL REMOVAL ALARM APPARATUS FOR VEHICLES
Filed April 28, 1941
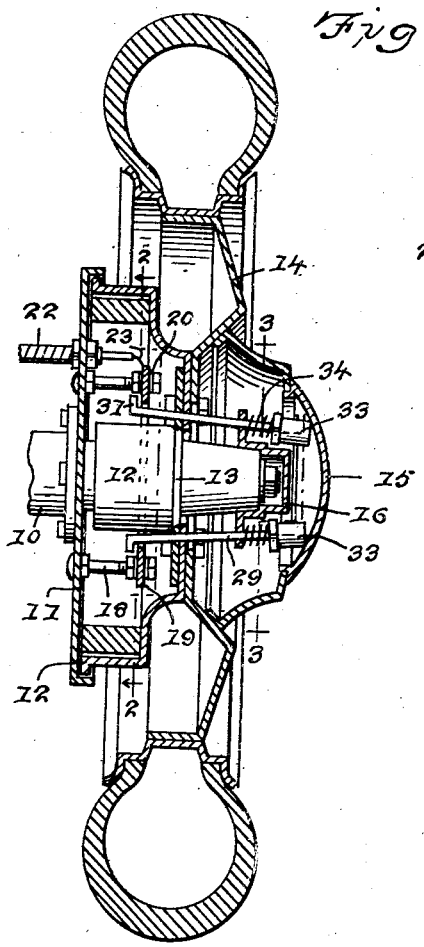
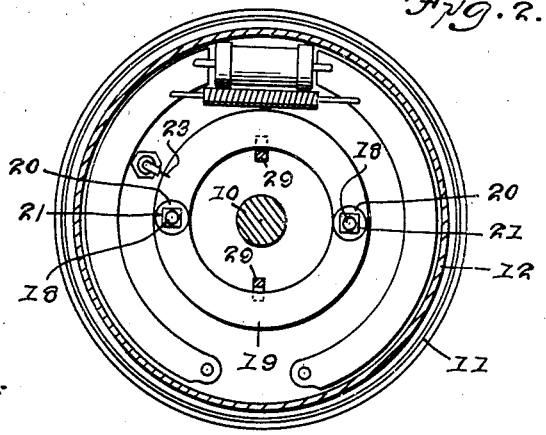
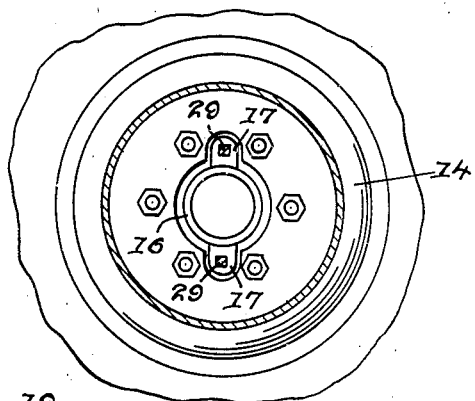
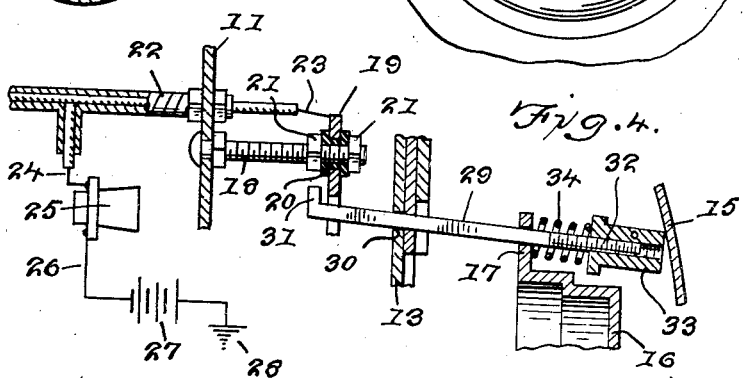
J. H. Fine
INVENTOR
BY Victor J. Evans & Co.
ATTORNEYS Patented Dec. 9, 1941

2,265,899

UNITED STATES PATENT OFFICE 2,265,899

WHEEL REMOVAL ALARM APPARATUS FOR VEHICLES

J. H. Fine, Midland, Tex.

Application April 28, 1941, Serial No. 390,800

4 Claims. (Cl. 200—52)

The present invention relates to wheel removal alarm apparatus for vehicles.

An object of the invention is to provide apparatus which will automatically sound and alarm when attempt is made to effect unauthorized removal of a wheel of a vehicle.

Another object of the invention is the provision of apparatus designed to automatically sound an alarm upon detachment of the hub cap of a wheel operatively mounted on a vehicle.

A further object of the invention is to provide automatically operable means for sounding the horn of a vehicle upon unauthorized removal of the hub cap of one of the vehicle wheels.

Still another object of the invention is the provision of switch mechanism mounted in a vehicle wheel designed to automatically close an electric circuit through the vehicle horn to sound the latter upon detachment of the wheel hub cap.

A still further object of the invention is the provision of apparatus of the aforesaid character which may be operatively mounted on vehicles of conventional construction.

Still another object of the invention is the provision of wheel removal alarm apparatus which is relatively simple in construction and reliable in operation.

Other objects and advantages of the invention will become apparent as the description progresses.

In the accompanying drawing forming a part of this specification and in which like numerals are employed to designate corresponding parts throughout:

Figure 1 is a transverse sectional view through a vehicle wheel equipped with the novel alarm apparatus, Figures 2 and 3 are sectional views taken on lines 2—2 and 3—3 respectively of Figure 1, and Figure 4 is an enlarged fragmentary sectional view of the apparatus.

Referring in detail to the drawing, wherein for the purpose of illustration is shown a preferred example of the invention, 10 designates the spindle of a conventional automobile having secured thereto in the usual manner a brake flange plate 11 carrying brake shoes in coacting relation with a brake drum 12. The latter is bolted or otherwise secured to the flange 13 of a hub 12. To the hub flange 13 is detachably fastened the inner web portion of a vehicle wheel 14 having an exterior opening normally closed by an outer removable hub cap 15.

On the outer end portion of the wheel hub 12, rotatably mounted on the spindle 10, is removably fitted an inner hub cap 16 having guide means formed at diametrically opposite portions, in the present example embodying a pair of radially projecting apertured ears 17.

To the fixed circular brake plate 11 are connected a pair of inwardly projecting bolts 18 rigidly fastened to the plate at diametrically opposed points thereof. On the inner ends of these bolts is secured, within the drum 12, an annular flat member of electric conducting material 19 disposed to form a contact ring spaced from and concentric with the inner portion of the wheel hub 12. The ring is secured on the bolts by fitting the same over bushings 20 of insulating material held between spaced nuts 21 on the inner threaded ends of the bolts, each of these bushings having a flange at one end and threadedly receiving a retaining nut on its opposite end so as to effectively insulate the ring 19 from the bolts.

Through an aperture in the flange plate 11 is extended one end of a tubular metal covering 22 forming the exterior armored sheathing of an insulation covered electric conductor 23 having one end connected with the periphery of the ring 19, as by soldering. As shown to advantage at Figure 4, the conductor 23 is connected, through a lead 24, with one terminal of an electric horn 25 constituting the conventional signal of an automobile. The opposite terminal of the horn is connected, through a lead 26, with the vehicle battery 27 which may be grounded on the frame as indicated at 28.

Through apertures in diametrically opposed points of the wheel hub flange 13 and the web of the brake drum 12 are extended a pair of complementary contact members 29. These members embody elongated rods of electric conducting material square in cross section throughout the major extent thereof and slidable through the square apertures, indicated at 30, in the hub flange and drum. At the inner end each rod 29 has a portion bent at approximately right angles outward and radially of the axis of the wheel to form a contact projection or finger 31. The outer square portion of each rod 29 is slidably extended through the correspondingly shaped aperture in each guide ear 17 of the inner cap 16 and outwardly of this connection the rod is round and exteriorly threaded, as indicated at 32, to engage the interior threaded bore of a sleeve thimble 33 longitudinally adjustable thereon. A coil spring 34 is sleeved about each rod 29 between the outer face of the lug 17 and the inner flanged end of the sleeve 33 carried thereon.

The apparatus for each of the rotary carrier wheels of the vehicle, including the steering wheel and the drive wheels, is initially adjusted by longitudinally positioning the sleeves 33 on the contact member 29 so that when the outer hub cap 15 is closed the springs 34 force the outer ends of the sleeves against the inner sides of the cap while maintaining the angularly directed contact fingers 31 spaced inwardly of and parallel with the inner marginal portion of the ring 19. Thus, upon detachment or removal of the hub cap 15 the springs 34 will act to push the sleeves together with the rods 29 outwardly of the wheel structure and move the fingers 31 into contact with the ring 19. Such action closes the electric circuit through the conductor 23, lead 24, horn 25, lead 26, battery 27 and through the ground connection 28, the opposite end of the circuit being grounded through the wheel, and its spindle or axle to operate the horn 25 and thus sound an alarm signaling an unauthorized removal of the hub cap and possible attempt to remove the wheel. As will be noted, the slidably mounted contact bars 29 carrying the movable contact fingers of the switch structure extend in positions approximately parallel with the axis of the wheel and are carried by the movable part of its hub structure while the contact ring 19 is mounted in fixed position in a plane perpendicular to the wheel axis and firmly attached to the stationary brake plate. This, in effect, forms a switch which is normally open and adapted to automatically close to energize the sound signal when the wheel hub cover is removed from its closure position.

Although a particular wheel construction is shown in the drawing it is obvious that the apparatus is applicable to and intended for wheel structures of varying types and design and can be readily mounted in association with all of the operative carrier wheels of an automobile or like vehicle.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In wheel removal alarm apparatus for a vehicle wheel having a removable hub cap and a stationary contact member secured in the fixed portion of the wheel, an axially disposed bar mounted for longitudinal sliding movement in the rotary part of the wheel, a projection on one end of the said bar engageable with the stationary contact member, and means yieldingly urging the said bar to force the projection into engagement with the fixed contact member, the said bar being held in retracted non-contacting position by the said hub cap when the latter is in closed position on the wheel.

2. In alarm switch means for a vehicle wheel having a removable hub cap and a stationary contact member secured to a fixed portion of the wheel, an elongated bar disposed axially in the rotary portion of the wheel and mounted to slide longitudinally therein, an angular contact projection formed on the inner end of the bar adapted to engage the stationary contact member when the said bar is extended, and a spring associated with the said bar and yieldingly urging the same to an extended position, the said bar being retracted to disengage the contact projection thereon from the stationary member by the said hub cap when the latter is in closure position on the wheel.

3. In switch means for a vehicle wheel having a removable hub cap at its outer side and an annular stationary contact member secured to a fixed portion at the inner side of the wheel, the said wheel having a guide opening therein, an elongated bar mounted axially in the rotary portion of the wheel and disposed to slide longitudinally through the said guide opening, a member having an apertured guide fixed on the wheel hub having the bar slidably extended therethrough, an angularly bent projection on the inner end of the bar in coacting relation with the stationary contact member, and a spring sleeved about the said bar yieldingly urging the same to an extended position for moving the projection into contact with the stationary contact member, the said bar being retracted by the removable hub cap when the latter is in closure position on the wheel.

4. In switch means for a vehicle wheel having a removable hub cap at its outer side and an annular stationary contact member secured to a fixed portion at the inner side of the wheel, the said wheel having a guide opening therein, an elongated bar mounted axially in the rotary portion of the wheel and disposed to slide longitudinally through the said guide opening, a member having an apertured guide fixed on the wheel hub having the bar slidably extended therethrough, an angularly bent projection on the inner end of the bar in coacting relation with the stationary contact member, a sleeve mounted on the outer portion of the bar and longitudinally adjustable thereon, and a spring mounted between the said sleeve and the apertured projection of the guide member yieldingly urging the bar to extended position for moving the projection on the inner end of the bar into contact with the stationary contact member, the sleeve being engaged by the removable hub cap to retract the bar for disengaging the projection thereof from the fixed contact member when the hub cap is in closure position.

J. H. FINE.